United States Patent
Digne et al.

(10) Patent No.: US 11,583,836 B2
(45) Date of Patent: Feb. 21, 2023

(54) PROCESS FOR DEPARAFFINNING A MIDDLE DISTILLATE FEEDSTOCK USING A CATALYST BASED ON IZM-2 ZEOLITE AND AN MFI-TYPE ZEOLITE

(71) Applicant: IFP Energies Nouvelles, Rueil-Malmaison (FR)

(72) Inventors: Mathieu Digne, Rueil-Malmaison (FR); Antoine Fecant, Rueil-Malmaison (FR); Chloe Bertrand-Drira, Rueil-Malmaison (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 17/382,478

(22) Filed: Jul. 22, 2021

(65) Prior Publication Data
US 2022/0023844 A1 Jan. 27, 2022

(30) Foreign Application Priority Data
Jul. 23, 2020 (FR) ...................... 2007730

(51) Int. Cl.
*B01J 23/883* (2006.01)
*B01J 29/80* (2006.01)
*B01J 29/78* (2006.01)
*B01J 35/10* (2006.01)
*B01J 8/02* (2006.01)
*C10G 49/04* (2006.01)

(52) U.S. Cl.
CPC ............ *B01J 23/883* (2013.01); *B01J 8/02* (2013.01); *B01J 29/78* (2013.01); *B01J 29/80* (2013.01); *B01J 35/1019* (2013.01); *B01J 35/1038* (2013.01); *C10G 49/04* (2013.01); B01J 2208/00017 (2013.01); B01J 2208/00539 (2013.01); B01J 2208/00548 (2013.01); B01J 2229/42 (2013.01); C10G 2300/107 (2013.01); C10G 2300/202 (2013.01); C10G 2300/301 (2013.01); C10G 2300/304 (2013.01); C10G 2300/308 (2013.01); C10G 2300/4006 (2013.01); C10G 2300/4012 (2013.01); C10G 2300/4018 (2013.01); C10G 2300/70 (2013.01)

(58) Field of Classification Search
CPC .......... B22F 2998/10; B22F 5/007; B22F 2003/247; B22F 3/04; B22F 3/10; B22F 10/10; B22F 10/20; B22F 2301/058; B22F 3/225; B33Y 10/00; B33Y 70/00; B33Y 80/00; C22C 1/0408; C22C 23/00; C22C 23/04; C22C 23/06; C22C 24/00; C22F 1/06; Y02P 10/25; B01J 2208/00017; B01J 2208/00539; B01J 2208/00548; B01J 2229/42; B01J 23/883; B01J 29/78; B01J 29/80; B01J 35/1019; B01J 35/1038; B01J 8/02; C10G 2300/1048; C10G 2300/1055; C10G 2300/107; C10G 2300/202; C10G 2300/301; C10G 2300/304; C10G 2300/308; C10G 2300/4006; C10G 2300/4012; C10G 2300/4018; C10G 2300/70; C10G 2400/04; C10G 45/64; C10G 49/04; H01H 71/0264; H01R 13/68
See application file for complete search history.

(56) References Cited

U.S. PATENT DOCUMENTS

| | | | |
|---|---|---|---|
| 5,762,902 A | 6/1998 | Benazzi et al. | |
| 7,449,421 B2 | 11/2008 | Benazzi et al. | |
| 2005/0130833 A1 | 6/2005 | Benazzi et al. | |
| 2011/0192765 A1* | 8/2011 | Guillon | C10G 47/20 208/143 |

FOREIGN PATENT DOCUMENTS

| | | | | |
|---|---|---|---|---|
| EP | 0785021 A1 | 7/1997 | | |
| EP | 2781497 A1 * | 9/2014 | ............ | B01J 29/80 |
| EP | 2781497 A1 | 9/2014 | | |
| FR | 2852865 A1 | 10/2004 | | |
| FR | 2989382 A1 | 10/2013 | | |
| WO | 2014/177429 A1 | 11/2014 | | |

OTHER PUBLICATIONS

EP2781497A1—Bib Translated (Year: 2014).*
EP2781497A1—Claims Translated (Year: 2014).*
EP2781497A1—Description Translated (Year: 2014).*
French Search Report dated Mar. 12, 2021 issued in corresponding FR 2007730 application (2 pages).
English Abstract of EP 2781497 A1 published Sep. 24, 2014.

* cited by examiner

*Primary Examiner* — Ellen M McAvoy
*Assistant Examiner* — Chantel L Graham
(74) *Attorney, Agent, or Firm* — Millen White Zelano & Branigan, PC; Brion P. Heaney

(57) ABSTRACT

The present invention relates to a process for deparaffinning a middle distillate feedstock, to convert, in good yield, feedstocks having high pour points into at least one cut having an improved pour point.
Said process is performed with at least one catalyst comprising at least one hydro-dehydrogenating phase containing at least one metal from group VIB and at least one metal from group VIII of the Periodic Table of the Elements, and a support comprising at least one IZM-2 zeolite, a zeolite of WI framework type code and at least one binder.

21 Claims, No Drawings

US 11,583,836 B2

PROCESS FOR DEPARAFFINNING A MIDDLE DISTILLATE FEEDSTOCK USING A CATALYST BASED ON IZM-2 ZEOLITE AND AN MFI-TYPE ZEOLITE

FIELD OF THE INVENTION

The present invention relates to a process for deparaffinning a middle distillate feedstock, to convert feedstocks having high pour points into at least one cut having an improved pour point, in good yield.

Said process is performed with at least one catalyst comprising at least one hydro-dehydrogenating phase containing at least one metal from group VIB and at least one metal from group VIII of the Periodic Table of the Elements, and a support comprising at least one IZM-2 zeolite, at least one zeolite of MFI framework type code and a binder.

PRIOR ART

The treatment of petroleum fractions of middle distillate type, i.e. of a feedstock comprising at least 95% by weight of compounds with a boiling point of between 150 and 400° C. and preferably between 150 and 380° C., said feedstocks having high contents of linear or sparingly branched paraffins, is necessary in order to obtain high-quality products which will subsequently be used as diesel fuel or as kerosene or jet fuel. This treatment consists in modifying the linear or very sparingly branched paraffins and in doing so with the best possible yields of middle distillate.

Specifically, high molecular weight paraffins which are linear or very sparingly branched and which are present in middle distillates (diesel and kerosene) lead to high pour points and thus to congealing for uses at low temperature. In order to lower the pour point values, these linear or very sparingly branched paraffins must be totally or partially removed.

Selective cracking of the longest linear paraffinic chains, which leads to the formation of compounds of lower molecular weight, part of which may be removed by distillation, is one solution for reducing the pour point values. Given their shape selectivity, zeolites are among the catalysts most widely used for this type of process. The catalyst that is the most widely used in the deparaffinning category by selective cracking is ZSM-5 zeolite, of MFI framework type code, which has three-dimensional porosity, with medium-sized pores (aperture at 10 oxygen atoms 10MR). However, the cracking brought about in such processes leads to the formation of large amounts of products of lower molecular weights, such as butane, propane, ethane and methane, which considerably reduces the yield of desired products.

Another solution for improving the cold resistance of a petroleum cut consists in isomerizing the linear paraffins present while minimizing the cracking. The shape selectivity of one-dimensional zeolites with medium-sized pores (10MR) such as the zeolites ZSM-22, ZSM-23, NU-10, ZSM-48 and ZBM-30 makes it possible to isomerize the feedstocks while minimizing the cracking reactions, which thereby makes it possible to increase the selectivity toward desired products.

In addition, it is known practice from patent application WO 13/153318 to use a catalyst comprising IZM-2 zeolite and optionally a zeolite chosen from the zeolites of framework type FER, BEA, TON, MRE, FAU, AEI and AFO and even more preferably from the zeolites ferrierite, beta, ZSM-48, ZSM-22, ZBM-30, Y, USY, NU-86, SAPO-11 and SAPO-18 for the hydrotreating and deparaffinning of a middle distillate feedstock having a high pour point to produce a product having a lower pour point, and to do so with the best possible yields of desired products.

Surprisingly, the Applicant has discovered that the use of a catalyst including a combination of at least one IZM-2 zeolite having isomerizing activity and of at least one zeolite of MFI framework type code having cracking activity in a process for the deparaffinning of a middle distillate feedstock makes it possible to substantially lower the pour point of said feedstock, while at the same time maintaining an improved yield of desired products, relative to catalysts comprising an isomerizing zeolite or zeolite combination alone, or a cracking zeolite or zeolite combination alone.

SUBJECTS OF THE INVENTION

One object of the invention is to provide a process for deparaffinning a middle distillate feedstock, using in a fixed-bed reactor at least one catalyst comprising at least one hydro-dehydrogenating phase containing at least one metal from group VIB and at least one metal from group VIII of the Periodic Table of the Elements, and a support comprising at least one IZM-2 zeolite, a zeolite of MFI framework type code and a binder, said process operating at a temperature of between 170 and 500° C., at a pressure of between 0.1 and 25 MPa, at an hourly space velocity of between 0.05 and 50 $h^{-1}$ and in the presence of a total amount of hydrogen mixed with the feedstock such that the hydrogen/feedstock ratio is between 50 and 2000 normal liters of hydrogen per normal liter of feedstock.

One advantage of the process according to the invention is that it converts a middle distillate feedstock having a high pour point into a product having a lower pour point, and does so with high activity and the best possible yields of desired products.

The Applicant has discovered, surprisingly, that the use of a catalyst including a combination of at least one isomerizing IZM-2 zeolite and of at least one cracking zeolite of MFI framework type code in a process for deparaffinning a middle distillate feedstock allows a synergistic effect which significantly improves the selectivity relative to the use of a catalyst comprising a cracking zeolite or zeolite combination alone, and which significantly improves the activity relative to the use of a catalyst comprising an isomerizing zeolite or zeolite combination alone. Said process thus makes it possible to obtain improved performance over the processes disclosed in the prior art.

Without wishing to be bound by any theory, it may be that the cracking of n-paraffins is favored relative to the cracking of isoparaffins (branched compounds) by the steric constraint provided by an astute combination of zeolites functioning simultaneously under selected operating conditions; this would thus permit the formed isomerate to not undergo any significant cracking and make it possible to obtain catalysts having high activity and high selectivity toward product of interest.

DETAILED DESCRIPTION OF THE INVENTION

Definitions

In the text hereinbelow, the groups of chemical elements are given according to the CAS classification (CRC Handbook of Chemistry and Physics, published by CRC Press, editor-in-chief D. R. Lide, $81^{st}$ edition, 2000-2001). For example, group VIII according to the CAS classification corresponds to the metals of columns 8, 9 and 10 according to the new IUPAC classification.

The term "specific surface area" means the BET specific surface area ($S_{BET}$ in m$^2$/g) determined by nitrogen adsorption in accordance with the standard ASTM D 3663-78 established from the Brunauer-Emmett-Teller method described in the journal "*The Journal of the American Chemical Society*", 1938, 60, 309.

The term "total pore volume" of the catalyst or of the support used for the preparation of the catalyst means the volume measured by mercury porosimetry intrusion according to the standard ASTM D4284-83 at a maximum pressure of 4000 bar (400 MPa), using a surface tension of 484 dynes/cm and a contact angle of 140°. The wetting angle was taken equal to 140° following the recommendations of the publication "Techniques de l'ingénieur, traité analyse et caractérisation" [Techniques of the Engineer, Analysis and Characterization Treatise], pages 1050-1055, written by Jean Charpin and Bernard Rasneur. In order to obtain better accuracy, the value of the total pore volume corresponds to the value of the total pore volume measured by mercury porosimetry intrusion measured on the sample minus the value of the total pore volume measured by mercury porosimetry intrusion measured on the same sample for a pressure corresponding to 30 psi (about 0.2 MPa).

The contents of group VIII and group VIB metals are measured by X-ray fluorescence.

The loss on ignition (or L01) of a solid is the relative loss of mass (expressed as a percentage) of a solid when it has been maintained at 1000° C. for 3 hours in a muffle furnace.

The term "cold-flow property" or "pour point" of the middle distillate (kerosene or gas oil) means any property whose measurement is normalized and which serves to define the cold resistance specifications for commercial fuels according to the geographical areas: cloud point, pour point, filtration limit temperature for gas oils, and "freezing point" for jet fuel.

Deparaffinning Process

The middle distillate feedstock treated in the process according to the invention comprises at least 95% by weight of compounds with a boiling point of between 150 and 450° C., preferably between 150 and 400° C. Alternatively, the feedstock is defined by a weighted mean temperature (WMT) of between 280° C. and 350° C. The WMT is defined from the temperature at which 5%, 50% and 70% of the volume of the feedstock distils according to the following formula: WMT=(T 5%+2×T 50%+4×T 70%)/7. The WMT is calculated from simulated distillation values or from the ASTM D86 distillation.

The middle distillate feedstock treated in the process according to the invention is advantageously a feedstock having a relatively high pour point, the value of which it is desired to reduce. A typical middle distillate feedstock that may be treated in the process according to the invention has a pour point of above −10° C. The process according to the present invention allows the production of products with pour points of less than 0° C. and preferably less than −10° C.

Preferably, said middle distillate feedstock treated in the process according to the invention is advantageously obtained from the direct distillation of a crude oil (or "straight run").

Said feedstock may also advantageously be obtained from a coking unit, a visbreaking unit, a steam cracking unit and/or a catalytic cracking (Fluid Catalytic Cracking) unit. Said feedstock may also advantageously be obtained from a unit for transforming biomass or an oil of plant or animal origin. Said feedstocks may be taken alone or as a mixture. Said feedstock may also advantageously be obtained from a unit for the chemical recycling, and notably the pyrolysis, of plastic waste.

Said middle distillate feedstock generally contains paraffins, olefins, naphthenes, aromatics and nitrogen, sulfur and oxygen organic compounds. Said feedstock has a paraffin content advantageously greater than 10% by weight and preferably greater than 20% by weight.

Preferably, said feedstock undergoes a catalytic hydrotreating step before being used in the deparaffinning process according to the invention. Said hydrotreating step is advantageously performed under the same temperature and pressure operating conditions as the deparaffinning process according to the invention.

The hydrotreating catalysts that may be used are conventional hydrotreating catalysts known to those skilled in the art. In particular, said catalysts comprise at least one group VIII metal, at least one group VIB metal and at least one support formed from at least one oxide. Preferably, the active phase of the hydrotreating catalysts consists of a "mixed" sulfide phase consisting of molybdenum (or, respectively, tungsten) disulfide leaflets decorated with promoter atoms (usually cobalt or nickel) at the periphery.

In this preferred embodiment, said middle distillate feedstock treated according to the process of the invention has a content of sulfur compounds advantageously between 0 ppm and 100 ppm by weight of sulfur, preferably between 1 ppm and 50 ppm by weight of sulfur, and has a content of nitrogen compounds of between 0 ppm and 100 ppm by weight of nitrogen, advantageously between 0 ppm and 20 ppm by weight of nitrogen. This upstream hydrotreating step may advantageously be performed in the same reactor as the deparaffinning process according to the invention or in a separate reactor, and the feedstock may or may not have undergone an operation for stripping of the dissolved $H_2S$ and $NH_3$.

In accordance with the invention, said deparaffinning process operates at a temperature of between 200° C. and 500° C., preferably between 250° C. and 440° C., at a pressure of between 0.1 and 25 MPa, preferably between 1 and 20 MPa, at an hourly space velocity of between 0.05 h$^{-1}$ and 50 h$^{-1}$, preferably between 0.1 h$^{-1}$ and 20 h$^{-1}$ and even more preferably between 0.1 h$^{-1}$ and 10 h$^{-1}$ and in the presence of a total amount of hydrogen mixed with the feedstock such that the hydrogen/feedstock ratio is between 50 and 2000 normal liters of hydrogen per liter of feedstock and preferably between 100 and 1500 normal liters of hydrogen per liter of feedstock.

Said one-step deparaffinning process according to the present invention operating under the above conditions makes it possible to convert a middle distillate feedstock having a high pour point into a product having a lower pour point, and to do so with the best possible yields of desired products and high activity.

Catalyst

In accordance with the invention, the deparaffinning process according to the invention uses at least one catalyst comprising at least one hydro-dehydrogenating phase containing at least one metal from group VIB and at least one metal from group VIII of the Periodic Table of the Elements, and a support comprising at least one IZM-2 zeolite, a zeolite of MFI framework type code and a binder.

Preferably, said catalyst has a total content of zeolite (IZM-2 and zeolite of MFI framework type code) of between 5% and 90% by weight relative to the total mass of said catalyst, preferably between 20% and 80% by weight and very preferably between 30% and 80% by weight.

Preferably, said catalyst contains 2.5% to 50% by weight of active phase expressed in oxide form, and very preferably from 3.0% to 36%.

Preferably, said catalyst contains 0.5% to 10% by weight of group VIII metal expressed in oxide form, preferably between 1% and 8% by weight of oxide and very preferably between 1% and 6% by weight of oxide.

Preferably, said catalyst contains 2% to 40% by weight of group VIB metal expressed in oxide form, preferably between 3% and 35% by weight of oxide and very preferably between 5% and 30% by weight of oxide.

Preferably, said catalyst comprises a binder content of between 10% and 95% by weight, preferably between 20% and 80% by weight relative to the total mass of said catalyst and very preferably between 20% and 70% by weight.

The Hydro/Dehydrogenating Function

Preferably, the group VIII elements are chosen from iron, cobalt and nickel, taken alone or as a mixture, and preferably, the group VIII elements are chosen from nickel and cobalt. Preferably, the group VIB elements are chosen from tungsten and molybdenum, taken alone or as a mixture. The following combinations of metals are preferred: nickel-molybdenum, cobalt-molybdenum, nickel-tungsten, cobalt-tungsten, and very preferably: nickel-molybdenum, nickel-tungsten. It is also possible to use combinations of three metals, for instance nickel-cobalt-molybdenum.

The content of group VIII element is advantageously between 0.5% and 10% by weight of oxide relative to the total mass of said catalyst, preferably between 0.5% and 8% by weight of oxide and very preferably between 1% and 6% by weight of oxide. The content of group VIB metal is advantageously between 1% and 40% by weight of oxide relative to the total mass of said catalyst, preferably between 2% and 35% by weight of oxide and very preferably between 5% and 30% by weight of oxide.

Preferably, the catalyst used according to the invention also contains phosphorus. When the catalyst contains phosphorus, the phosphorus content is advantageously between 0.5% and 15% by weight of oxide $P_2O_5$ relative to the total mass of said catalyst, preferably between 1% and 10% by weight of oxide.

The catalyst was obtained by impregnation of the support. Any method known to a person skilled in the art may be used for performing this impregnation step. Preferably, it will have been performed via a method of dry impregnation with a solution containing the precursors of the hydro/dehydrogenating function.

The catalyst used according to the invention is preferentially used in a sulfurized form. Any method known to a person skilled in the art may be used to obtain the catalyst in sulfurized form.

The Support

The catalyst used in the process according to the invention comprises a support comprising at least one IZM-2 zeolite, at least one zeolite of MFI framework type code and a binder.

Preferably, the support for the catalyst used in the invention has a total pore volume measured by mercury porosimetry of between 0.1 and 1 cm$^3$/g and preferentially between 0.3 and 0.9 cm$^3$/g.

The specific surface area of the support is preferably between 100 m$^2$/g and 500 m$^2$/g, and more preferably between 200 m$^2$/g and 400 m$^2$/g.

The support is shaped in the form of grains of various shapes and sizes. They are generally used in the form of cylindrical extrudates or polylobal extrudates, such as trilobal, quadrilobal or polylobal extrudates, of straight or twisted form, but can optionally be manufactured and employed in the form of crushed powders, lozenges, rings, beads or wheels. However, it is advantageous for the catalyst to be in the form of extrudates with a diameter of between 0.5 and 5 mm and more particularly between 1 and 3 mm. The shapes are cylindrical (which may or may not be hollow), twisted cylindrical, multilobal (for example 2, 3, 4 or 5 lobes) or annular. The cylindrical shape is advantageously preferably used, but any other shape can advantageously be used.

Preferably, said support has a total content of zeolite (IZM-2 zeolite and zeolite of MFI framework type code) of between 10% and 90% by weight relative to the total mass of said support, preferably between 30% and 80% by weight and very preferably between 40% and 80% by weight.

Preferably, the mass ratio of the IZM-2 zeolite to the zeolite of MFI framework type code and preferably the ZSM-5 zeolite in the support is between 0.25 and 9 and very preferably between 0.3 and 6.

IZM-2 Zeolite

In accordance with the invention, said catalyst comprises a support comprising at least one IZM-2 zeolite, at least one zeolite of MFI framework type code and at least one binder.

IZM-2 zeolite is a crystalline microporous solid having a crystal structure described in patent application FR 2 918 050. The process for preparing IZM-2 zeolite is also described in said patent application.

Said solid IZM-2 has a chemical composition expressed on an anhydrous basis, in terms of moles of oxides, defined by the following general formula: $XO_2:aY_2O_3:bM_2/nO$, in which X represents at least one tetravalent element, Y represents at least one trivalent element and M is at least one alkali metal and/or alkaline-earth metal of valency n.

X is preferentially chosen from silicon, germanium, titanium and a mixture of at least two of these tetravalent elements; very preferentially, X is silicon and Y is preferentially chosen from aluminum, boron, iron, indium and gallium; very preferentially, Y is aluminum. M is preferentially chosen from lithium, sodium, potassium, calcium, magnesium and a mixture of at least two of these metals, and very preferentially M is sodium. Preferably, X represents silicon; the crystalline solid IZM-2 according to the invention is then an entirely silicic solid when the element Y is absent from the composition of said solid IZM-2. It is also advantageous to use as element X a mixture of several elements, in particular a mixture of silicon with another element X chosen from germanium and titanium, preferably germanium. Thus, when silicon is present as a mixture with another element X, the crystalline solid IZM-2 according to the invention is then a crystalline metallosilicate having an X-ray diffraction pattern identical to that described in table 1 of patent FR 2 918 050 when it is in its calcined form. Even more preferably and in the presence of an element Y, X being silicon and Y being aluminum: the crystalline solid IZM-2 according to the invention is then an aluminosilicate. Preferably, the IZM-2 zeolite is in aluminosilicate form.

Preferably, the mole ratio of the number of silicon atoms to the number of aluminum atoms Si/Al is less than 200, preferably less than 150 and very preferably less than 120.

The IZM-2 zeolite included in the composition of the support for the catalyst according to the invention is advantageously exchanged via at least one treatment with a solution of at least one ammonium salt so as to obtain the ammonium form of the IZM-2 zeolite, which, once calcined, leads to the acid form (H+) of said IZM-2 zeolite. This exchange step may be performed at any step in the preparation of the catalyst, i.e. after the step of preparing the IZM-2 zeolite, after the step of forming IZM-2 zeolite and the zeolite of MFI framework type code with a porous mineral binder, or even after the step of introducing the hydro-dehydrogenating phase.

Said IZM-2 zeolite included in the composition of the support for the catalyst used in the process according to the invention is advantageously at least partly, and preferably virtually totally, in acid form, i.e. in the form $H^+$.

The Zeolite of MFI Framework Type Code

In accordance with the invention, said catalyst comprises a support comprising at least one IZM-2 zeolite, at least one zeolite of MFI framework type code and a binder.

Zeolites of MFI framework type are crystalline microporous solids and have been described in the literature (G. T. Kokotailo, S. L. Lawton, D. H. Olson, W. M. Meier, Nature, volume 272, pages 437-438, 1978; D. H. Olson, G. T Kokotailo, S. L. Lawton, W. M. Meier, J. Phys. Chem., volume 85, pages 2238-2243, 1981; H. van Koningsveld, J. C. Jansen, H. van Bekkum, Zeolites, volume 10, pages 235-242, 1990). The crystal structure of these materials is described in the documents "Collection of simulated XRD powder patterns for zeolites", Ed. M. M. J. Treacy and J. B. Higgins, Fifth Revised Edition, 2007, pages 280-281 and "Atlas of zeolite framework types", C. Baerlocher, L. B. McCusker, D. H. Olson, Sixth Revised Edition, 2007, pages 212-213.

The processes for preparing the zeolites of MFI framework type code are also described in said documents.

Said zeolite of MFI framework type code has a chemical composition expressed on an anhydrous basis, in terms of moles of oxides, defined by the following general formula: (96-a) $XO_2$:a/2 $Y_2O_3$:a/2 $M_{2/n}O$, in which X represents at least one tetravalent element, Y represents at least one trivalent element, M is at least one alkali metal and/or alkaline-earth metal of valency n, and x<27.

X is preferentially chosen from silicon, germanium, titanium and a mixture of at least two of these tetravalent elements; very preferentially, X is silicon and Y is preferentially chosen from aluminum, boron, iron, indium and gallium; very preferentially, Y is aluminum. M is preferentially chosen from lithium, sodium, potassium, calcium, magnesium and a mixture of at least two of these metals, and very preferentially M is sodium. Preferably, X represents silicon; said zeolite of MFI framework type code according to the invention is then an entirely silicic solid when the element Y is absent from the composition of said zeolite of MFI framework type code. It is also advantageous to use as element X a mixture of several elements X, in particular a mixture of silicon with another element X chosen from germanium and titanium, preferably germanium. Thus, when silicon is present as a mixture with another element X, said zeolite of MFI framework type code according to the invention is then a crystalline metallosilicate having an X-ray diffraction pattern identical to that described in "Collection of simulated XRD powder patterns for zeolites", Ed. M. M. J. Treacy and J. B. Higgins, Fifth Revised Edition, 2007, pages 280-281 when it is in its calcined form. Even more preferably and in the presence of an element Y, X being silicon and Y being aluminum: said zeolite of MFI framework type code according to the invention is then an aluminosilicate. Preferably, said zeolite of MFI framework type code according to the invention is in aluminosilicate form.

Preferably, the zeolite of MFI framework type code is ZSM-5.

Preferably, the mole ratio of the number of silicon atoms to the number of aluminum atoms Si/Al is less than 100, preferably less than 70 and very preferably less than 50.

The zeolite of MFI framework type code included in the composition of the support for the catalyst according to the invention is advantageously exchanged via at least one treatment with a solution of at least one ammonium salt so as to obtain the ammonium form of the zeolite of MFI framework type code, which, once calcined, leads to the acid form ($H^+$) of said zeolite of MFI framework type code. This exchange step may be performed at any step in the preparation of the catalyst, i.e. after the step of preparing the zeolite of MFI framework type code, after the step of forming the IZM-2 zeolite and the zeolite of MFI framework type code with a porous mineral binder, or even after the step of introducing the hydro-dehydrogenating phase.

Said zeolite of MFI framework type code included in the composition of the support for the catalyst used in the process according to the invention is advantageously at least partly, and preferably virtually totally, in acid form, i.e. in the form H.

The Binder

According to the invention, the support for the catalyst used in the process according to the invention contains a binder. Said binder may advantageously be amorphous or crystalline. Preferably, said binder is advantageously chosen from the group formed by the following oxides or the hydrate forms thereof: alumina, silica, silica/alumina, clays, titanium oxide, boron oxide and zirconia, taken alone or as a mixture. Preferably, said binder for the support is alumina or an aluminum hydroxide, alone or as a mixture. Preferably, said binder for the support is alumina in all its forms known to those skilled in the art, for instance aluminas of α, γ, η or δ type or hydroxides, such as boehmite, bayerite or gibbsite. Said aluminas differ in their specific surface area and their pore volume. The loss on ignition of the binder is advantageously greater than 15%.

Preferably, said support comprises from 10% to 90% by weight of binder, preferably from 20% to 70% by weight and very preferably between 20% and 60% by weight, relative to the total mass of said support.

Preparation of the Catalyst

Forming of the IZM-2/MFI Zeolite/Binder Support

The support for the catalyst used in the process according to the invention may advantageously be prepared according to any method well known to those skilled in the art.

According to a preferred preparation method, said IZM-2 crystalline zeolites and zeolites of MFI framework type code and binder(s) may be introduced, without this being limiting, in the form of powder, ground powder, suspension, or suspension which has undergone a deagglomeration treatment. Said crystalline zeolites and binders may advantageously have been mixed beforehand (for example by mechanical mixing or by placing in suspension in the presence or absence of an acid) at a concentration adjusted to the final content of zeolites and of binder targeted in the catalyst used according to the present invention.

The support for the catalyst used in the process according to the invention may advantageously be formed via any technique known to those skilled in the art. The forming may advantageously be performed, for example, by kneading-extrusion, by pelletizing, by the drop coagulation (oil-drop) method, by granulation on a rotating plate or via any other method that is well known to those skilled in the art.

The forming may advantageously be performed by kneading in the presence of the various constituents of the catalyst to form a mineral paste, followed by extrusion of the paste obtained. Water is introduced during the kneading step, so that the loss on ignition of the paste is between 0 and 100%, preferably between 20% and 80% and very preferably between 30% and 70%.

The kneading step may advantageously be performed by introducing a total acid content, expressed as a percentage relative to the mass of dried binder introduced, of between 0 and 10% by weight (acidic kneading) followed by introducing a degree of neutralization, expressed as a weight percentage of base relative to the amount of acid introduced previously, of between 0 and 200% (basic kneading). Preferably, the total acid content, expressed as a percentage relative to the mass of dried binder, is between 0 and 6% and very preferably between 0 and 4%. Preferably, the degree of neutralization expressed as a weight percentage of base relative to the amount of acid is between 0 and 100% and preferably between 0 and 40%.

Preferably, the acid used is chosen from nitric acid and carboxylic acids preferably chosen from acetic acid, citric acid and butyric acid, and preferably nitric acid. Preferably, the base used is chosen from inorganic bases chosen from sodium hydroxide, potassium hydroxide and ammonia, and organic bases in solution chosen from amines and quaternary ammonium compounds. Preferably, the organic bases in solution are chosen from alkylethanolamines and alkylamines that are ethoxylated. The organic bases are preferably used as a solution in water. Very preferably, said base is ammonia and preferably ammonia as an aqueous solution ($NH_4OH$).

Any additive known to those skilled in the art for facilitating the formation of the paste, its homogenization and the formation of the support during extrusion may be used. Examples of additives that may notably be mentioned include cellulose, carboxymethylcellulose, carboxyethylcellulose, tall oil, xanthan gums, surfactants, flocculants such as polyacrylamides, carbon black, starches, stearic acid, polyacryl alcohol, polyvinyl alcohol, biopolymers, glucose, polyethylene glycols, etc.

The extrusion may advantageously be performed with any conventional commercially available tool. The paste derived from the blending is advantageously extruded through a die, for example using a piston or a single-screw or twin-screw extruder. This extrusion step may advantageously be performed via any method known to those skilled in the art.

Heat Treatment of the IZM-2/MFI Zeolite/Binder Support

After forming, the support for the catalyst used in the process according to the present invention is then advantageously subjected to a drying step. Said drying step is advantageously performed via any technique known to those skilled in the art.

Preferably, the drying is performed under a stream of air, said air stream possibly being dry or wet. Said drying may also advantageously be performed under a stream of any oxidizing, reducing or inert gas. Preferably, the drying is advantageously performed between 50° C. and 180° C., preferably between 60° C. and 150° C. and very preferably between 80° C. and 130° C. Preferably, said drying step takes place for a time of between 2 hours and 10 hours.

Said support, optionally dried, is subsequently preferably subjected to a calcination step. Said calcination step is advantageously performed in the presence of molecular oxygen, for example by flushing with air, the air possibly being dry or wet, at a temperature advantageously greater than 200° C. and less than or equal to 1100° C. Said calcination step may advantageously be performed in a traversed bed, in a licked bed or under a static atmosphere. For example, the oven used may be a rotary oven or a vertical oven with radial traversed layers. The calcination may advantageously be performed in the presence of steam and/or in the presence of an acidic or basic vapor. For example, the calcination may be performed under a partial pressure of ammonia. Preferably, said calcination step takes place for a time of between 2 hours and 10 hours.

Post-calcination treatments may optionally be performed, so as to improve the properties of the support, for example the textural properties.

Post-Synthesis Treatment of the IZM-2/MFI Zeolite/Binder Support

The IZM-2/zeolite of MFI framework type code/binder support for the catalyst used in the process according to the present invention may thus optionally be subjected to a hydrothermal treatment in a confined atmosphere. The term "hydrothermal treatment in a confined atmosphere" means a treatment by passing through an autoclave in the presence of water at a temperature above room temperature.

During this hydrothermal treatment, the support can advantageously be treated. Thus, the support can advantageously be impregnated, prior to its treatment in the autoclave, the autoclaving being performed either in the vapor phase or in the liquid phase, this vapor or liquid phase of the autoclave possibly being or not being acidic. This impregnation, prior to autoclaving, may advantageously be acidic or not. This impregnation, prior to autoclaving, may advantageously be performed dry or by immersing the support in an acidic aqueous solution. The term "dry impregnation" means placing the support in contact with a volume of solution less than or equal to the total pore volume of the support. Preferably, the impregnation is performed dry.

Deposition of the Hydro-Dehydrogenating Phase

The hydro-dehydrogenating phase may advantageously be introduced into any step of the preparation, very preferably after forming said IZM-2/zeolite of MFI framework type code/binder support.

The forming is advantageously followed by calcination; the hydro-dehydrogenating function may also advantageously be introduced before or after this calcination. In this variant, the preparation ends with calcination at a temperature generally of 250° C. to 600° C.

Another of the preferred methods according to the present invention advantageously consists in forming the IZM-2/MFI zeolite/binder support after kneading of the latter and then passing the paste thus obtained through a die to form extrudates. The hydro-dehydrogenating function may advantageously then be introduced, in part only or in its entirety, at the time of kneading.

Preferably, the support is impregnated with an aqueous solution. The impregnation of the support is preferably performed via the method of "dry" impregnation, which is well known to those skilled in the art. The impregnation may advantageously be performed in a single step with a solution containing all of the constituent elements of the hydro-dehydrogenating phase.

The hydro-dehydrogenating phase may advantageously be introduced via one or more operations for impregnation of the formed and calcined support, with a solution containing at least one precursor of at least one oxide of at least one metal chosen from the group formed by group VIII elements and at least one precursor of at least one oxide of at least one metal chosen from the group formed by group VIB elements. Said precursors are preferably introduced at the same time. In the preferred variant in which the group VIII element is nickel or cobalt, and the group VIB elements are molybdenum or tungsten, the precursors that may be used in the catalyst preparation process are, for example, nickel nitrate, nickel dihydroxide, nickel acetate, nickel carbonate, cobalt nitrate, cobalt dihydroxide, cobalt acetate, cobalt carbonate, ammonium heptamolybdate, molybdic acid, molybdenum oxide, ammonium metatungstate, tungstic acid or tungsten oxide. Any other compound known to those skilled in the art which has sufficient solubility may also be used.

The impregnation of the precursors of the elements chosen from the group VIII elements and the group VIB elements may advantageously be facilitated by adding phosphoric acid to the aqueous solutions.

The following elements: boron and/or silicon and/or phosphorus may be introduced into the catalyst at any stage in the preparation and according to any technique known to those skilled in the art.

A preferred method according to the invention consists in depositing the chosen promoter element(s), for example the boron-silicon couple, onto the calcined or non-calcined, preferably calcined, formed IZM-2/MFI zeolite/binder support. To do this, an aqueous solution of at least one boron salt such as ammonium diborate or ammonium pentaborate is prepared in alkaline medium and in the presence of aqueous hydrogen peroxide solution, and dry impregnation is performed, in which the pore volume of the precursor is filled with the solution containing, for example, boron. In the case where silicon is also deposited, for example, use is made, for example, of a solution of a silicon compound of silicone type or silicone oil emulsion type.

The promoter element(s) chosen from the group formed by silicon, boron and phosphorus may advantageously be introduced via one or more impregnation operations with excess solution onto the calcined precursor. The source of boron may advantageously be boric acid, preferably orthoboric acid $H_3BO_3$, ammonium diborate or pentaborate, boron oxide or boric esters. The boron may be introduced, for example, in the form of a mixture of boric acid, aqueous hydrogen peroxide solution and a basic organic compound containing nitrogen such as ammonia, primary and secondary amines, cyclic amines, compounds of the pyridine and quinoline families and compounds of the pyrrole family. The boron may be introduced, for example, by a solution of boric acid in a water/alcohol mixture.

The preferred source of phosphorus is orthophosphoric acid $H_3PO_4$, but its salts and esters, such as ammonium phosphates, are also suitable for use. The phosphorus may be introduced, for example, in the form of a mixture of phosphoric acid and a basic organic compound containing nitrogen such as ammonia, primary and secondary amines, cyclic amines, compounds of the pyridine and quinoline families and compounds of the pyrrole family.

Many sources of silicon may advantageously be used. Thus, use may be made of ethyl orthosilicate $Si(OEt)_4$, siloxanes, polysiloxanes, silicones, silicone emulsions, halide silicates such as ammonium fluorosilicate $(NH_4)_2SiF_6$ or sodium fluorosilicate $Na_2SiF_6$. Silicomolybdic acid and salts thereof, silicotungstic acid and salts thereof may also advantageously be used. Silicon may advantageously be added, for example, by impregnation of ethyl silicate as a solution in a water/alcohol mixture. Silicon may be added, for example, by impregnation of a silicon compound of silicone or silicic acid type suspended in water.

After impregnation of the constituent elements of the hydro-dehydrogenating phase, the support thus filled with the impregnation solution may optionally undergo a maturation step at room temperature, for a time of between 0.5 hour and 24 hours, preferably between 1 hour and 6 hours.

After impregnation, and an optional maturation step, the solid obtained undergoes a drying step for a time of between 0.5 hour and 24 hours, preferably between 1 hour and 12 hours. Preferably, the drying is performed under a stream of air, said air stream possibly being dry or wet. Preferably, the drying is advantageously performed between 50° C. and 180° C., preferably between 60° C. and 150° C.

Said dried, optionally matured solid then optionally undergoes a calcination step for a time of between 0.5 hour and 24 hours, preferably between 1 hour and 12 hours. Said calcination step is advantageously performed in the presence of molecular oxygen, for example by flushing with air, the air possibly being dry or wet, at a temperature advantageously between 200° C. and 600° C., preferably between 300° C. and 500° C.

The hydro-dehydrogenating phase of the catalyst used in the process according to the invention is preferably used in sulfurized form. Sulfurization of the catalyst may be performed in situ or ex situ by any method known to those skilled in the art. In the case of an in situ sulfurization step, the catalyst is sulfurized by treating with a feedstock containing $H_2S$ or at least one sulfur compound, which, once decomposed, leads to the fixing of sulfur onto the active phase. This feedstock may be gaseous or liquid, for example hydrogen containing $H_2S$, or a liquid containing at least one sulfur compound. In the case of ex situ sulfurization, a sulfur compound may be introduced onto the catalyst optionally in the presence of another compound. The catalyst is subsequently dried, and then transferred into the reactor serving to perform the process according to the invention. In this reactor, the catalyst is then treated under hydrogen so as to transform at least part of the main metal into sulfide. A procedure that is particularly suitable for use in the invention is the one described in patents FR-B-2 708 596 and FR-B-2 708 597.

The catalyst used in the process according to the invention may advantageously be used in beds combined with one or more hydrotreating catalysts in the case where a hydrotreating step is performed upstream of the deparaffinning process according to the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 2007730, filed Jul. 23, 2020 are incorporated by reference herein.

The examples that follow illustrate the invention without, however, limiting its scope.

EXAMPLES

Example 1: Preparation of the Supports

ZSM-5 zeolite of MFI framework type code is a commercial solid (Zeolyst®) in $NH_4$ form and with an Si/Al atomic ratio of 25.

The IZM-2 zeolite was synthesized in accordance with the teaching of patent application FR 2 918 050. The crude synthetic zeolite is subjected to calcination at 550° C. under a stream of dry air for 12 hours. After cationic exchange, the IZM-2 zeolite is in acidic form and has an Si/Al atomic ratio of 80.

In order to prepare the catalyst supports, the zeolites are kneaded with a boehmite binder (Sasol®, Pural SB3). The boehmite and zeolite powders are dry-blended before being introduced into the kneading tank. Kneading is performed in a closed tank with a solid lid on a double-arm Z-blade kneader (Guittard®) of MX type, with a rotation speed of 50 rpm. Water is gradually introduced to reach an LOI of between 40-50%. Passage into paste form takes place after 3 to 15 minutes. The kneaded paste is then extruded with a piston extruder through a die 3 mm in diameter. The extrudates thus obtained are dried (overnight at 120° C. in an air-ventilated oven) and then calcined at 540° C. for 4 hours in dry air. The amounts of IZM-2 and ZSM-5 zeolite and of alumina gel are adjusted so as to obtain the supports A to I presented in table 1.

TABLE 1

Characteristics of the supports

| | Supports | | | | | | | | |
|---|---|---|---|---|---|---|---|---|---|
| | A | B | C | D | E | F | G | H | I |
| ZSM-5 content (weight %) | 15 | 24 | 35 | 75 | 0 | 60 | 0 | 50 | 0 |
| IZM-2 content (weight %) | 60 | 36 | 15 | 0 | 75 | 0 | 60 | 0 | 50 |
| IZM-2/ZSM-5 mass ratio | 4.0 | 1.5 | 0.4 | n.a. | n.a. | n.a. | n.a. | n.a. | n.a. |
| Pore volume (mL/g) | 0.35 | 0.43 | 0.49 | 0.33 | 0.34 | 0.42 | 0.42 | 0.49 | 0.48 |
| Specific surface area ($m^2/g$) | 370 | 350 | 336 | 373 | 376 | 352 | 357 | 335 | 339 | n.a.: not applicable

Example 2: Preparation of the Catalysts

Supports A to I in the form of extrudates obtained in example 1 are dry-impregnated with an impregnation solution prepared by hot dissolution of molybdenum oxide ($MoO_3$, Alfa Aesar®, 99.5%) and nickel dihydroxide (Ni(OH)$_2$, Alfa Aesar®, 61% metal basis) in aqueous phosphoric acid solution ($H_3PO_4$, Alfa Aesar®, 85% aqueous solution). After dry impregnation, the extrudates are left to mature under an atmosphere saturated with water for 2 hours, and are then dried for 12 hours at 120° C. and finally calcined under a stream of dry air at 450° C. for 2 hours. The amounts of molybdenum oxide, nickel dihydroxide and phosphoric acid are adjusted to obtain the following contents of molybdenum, nickel and phosphorus in oxide form on the catalysts. 2.0% by weight of NiO, 7.0% by weight of $MoO_3$ and 2.5% by weight of $P_2O_5$. Catalysts A to I corresponding, respectively, to the supports A to I are thus obtained.

Example 3: Use of the Catalysts in a Process for Deparaffinning a Gas Oil

Catalysts A to I used for the deparaffinning of an atmospheric distillation gas oil which has undergone a hydrotreating step beforehand, the main features of which are given in table 2.

TABLE 2

Characteristics of the hydrotreated atmospheric distillation gas oil

| | |
|---|---|
| Sulfur content (ppm by weight) | 7.5 |
| Nitrogen content (ppm by weight) | <5 |
| Pour point (° C.) | 0.0 |
| Density at 15° C. (g/mL) | 0.841 |
| Simulated distillation | |
| Point at 0.5% by weight (° C.) | 135 |
| Point at 5% by weight (° C.) | 190 |
| Point at 25% by weight (° C.) | 257 |
| Point at 50% by weight (° C.) | 297 |
| Point at 70% by weight (° C.) | 325 |
| Point at 99.5% by weight (° C.) | 428 |
| WMT (weighted mean temperature—° C.) | 298 |

The deparaffinning process is performed in a fixed-bed reactor and with lost hydrogen (no recycling of the hydrogen).

The catalysts are sulfurized in situ in the reactor before the catalytic test. This sulfurization is performed in the presence of hydrogen with the sulfurization atmospheric distillation gas oil supplemented with 2% by weight of dimethyl disulfide DMDS under the following conditions:
a total pressure of 4 MPa,
an hourly space velocity (HSV) relative to the supplemented gas oil of 2 $h^{-1}$,
a ratio of $H_2$/supplemented gas oil entering the reactor of 300 normal liters of hydrogen per liter of supplemented gas oil.

The heat treatment performed during this sulfurization step is as follows: after 1 hour at 150° C., the temperature is increased with a ramp of 25° C./hour up to 220° C., and then with a ramp of 12° C./hour until a steady stage of 345° C. is reached, which is maintained for 12 hours.

The test atmospheric distillation gas oil is supplemented with 0.94% by weight of dimethyl disulfide DMDS and 0.25% by weight of aniline. These additives degrade before contact with the catalyst to form, respectively, the compounds $H_2S$ and $NH_3$. Total degradation of these additives is verified during the test.

The supplemented test atmospheric distillation gas oil is then injected to start the deparaffinning test, the other conditions remaining unchanged, namely:
a total pressure of 4 MPa,
an hourly space velocity (HSV) relative to the supplemented gas oil of 2 $h^{-1}$,
a ratio of $H_2$/supplemented gas oil entering the reactor of 300 normal liters of hydrogen per liter of gas oil,
a temperature of 345° C.

The characteristics of the effluents and the levels of losses of gas oil cut obtained after 120 hours of testing are given in table 3. The losses of yield of 150° C.$^+$ cut may be calculated from the simulated distillation of the effluent.

TABLE 3

Characteristics of the effluents and losses of gas oil yield

| Catalyst used | Pour point (° C.) | Gas oil losses (weight %) |
|---|---|---|
| A (compliant) | −15.0 | 7.0 |
| B (compliant) | −15.1 | 7.7 |
| C (compliant) | −15.2 | 8.4 |
| D (non-compliant) | −24.4 | 15.9 |
| E (non-compliant) | −8.8 | 5.0 |
| F (non-compliant) | −20.3 | 12.5 |
| G (non-compliant) | −7.3 | 4.5 |

TABLE 3-continued

Characteristics of the effluents and losses of gas oil yield

| Catalyst used | Pour point (° C.) | Gas oil losses (weight %) |
|---|---|---|
| H (non-compliant) | −16.6 | 10.3 |
| I (non-compliant) | −5.9 | 4.1 |

It is found that the use of the catalysts according to the invention comprising an IZM-2 zeolite and a zeolite of MFI framework type (ZSM-5) make it possible to significantly reduce the pour point of the gas oil feedstock while at the same time limiting the losses of yield of the 150° C.+ cut.

Specifically, for an identical content of zeolite, the compliant catalysts A, B and C are more selective than the non-compliant catalysts D, F and H containing, respectively, only zeolite of MFI framework type code and are more active than the non-compliant catalysts E, G and I containing, respectively, only the IZM-2 zeolite.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for deparaffinning a middle distillate feedstock, said process comprising:
deparaffinning said middle distillate feedstock in a fixed bed reactor in the presence of a at least one catalyst comprising at least one hydro-dehydrogenating phase containing at least one metal from group VIB and at least one metal from group VIII of the Periodic Table of the Elements, and a support comprising at least one IZM-2 zeolite, at least one zeolite of MFI framework type code, and a binder,
wherein said fixed bed reactor is operated at a temperature of between 170 and 500° C., at a pressure of between 0.1 and 25 MPa, at an hourly space velocity of between 0.05 and 50 h$^{-1}$, and
wherein said deparaffinning is preformed in the presence of a total amount of hydrogen mixed with the feedstock such that the hydrogen/feedstock ratio is between 50 and 2000 normal liters of hydrogen per normal liter of feedstock.

2. The process as claimed in claim 1, in which said feedstock comprises at least 95% by weight of compounds with a boiling point of between 150 and 400° C.

3. The process as claimed in claim 1, in which said feedstock is chosen from feedstocks obtained from the direct distillation of a crude oil, feedstocks obtained from a coking unit, from a visbreaking unit, from a steam cracking unit and from a catalytic cracking unit, feedstocks obtained from a unit for transforming biomass or an oil of plant or animal origin, and feedstocks obtained from a unit for the chemical recycling, taken alone or as a mixture.

4. The process as claimed in claim 1, in which the group VIII elements are chosen from iron, cobalt, and nickel, taken alone or as a mixture.

5. The process as claimed in claim 1, in which the group VIB elements are chosen from tungsten and molybdenum, taken alone or as a mixture.

6. The process as claimed in claim 1, in which the content of group VIII metal is between 0.5% and 10% by weight of oxide relative to the total mass of said catalyst and the content of non-noble group VIB metal is between 1% and 40% by weight of oxide relative to the total mass of said catalyst.

7. The process as claimed in claim 1, in which said catalyst contains a total content of IZM 2 zeolite and zeolite of MFI framework type code of between 5% and 90% by weight relative to the total mass of said catalyst.

8. The process as claimed in claim 1, in which said catalyst comprises a content of binder of between 10% and 95% by weight relative to the total mass of said catalyst.

9. The process as claimed in claim 1, in which the zeolite of MFI framework type code is ZSM-5.

10. The process as claimed in claim 9, in which the mass ratio of IZM-2 zeolite to ZSM-5 zeolite in the support is between 0.25 and 9.

11. The process as claimed in claim 1, in which process is performed at a temperature of between 250 and 440° C., at a pressure of between 1 and 20 MPa, at an hourly space velocity of between 0.1 and 10 h$^{-1}$ and in the presence of a total amount of hydrogen mixed with the feedstock such that the hydrogen/feedstock ratio is between 100 and 1500 liters of hydrogen per liter of feedstock.

12. The process as claimed in claim 1, wherein said feedstock is chosen from feedstocks obtained from the direct distillation of a crude oil, feedstocks obtained from a coking unit, from a visbreaking unit, feedstocks obtained from a steam cracking unit, feedstocks obtained from a catalytic cracking unit, feedstocks obtained from a unit for transforming biomass or an oil of plant or animal origin, and feedstocks obtained from pyrolysis of plastic waste, taken alone or as a mixture.

13. The process as claimed in claim 1, wherein said feedstock comprises at least 95% by weight of compounds with a boiling point of between 150 and 450° C.

14. The process as claimed in claim 1, wherein said feedstock has a weighted mean temperature of between 280° C. and 350° C.

15. The process as claimed in claim 1, wherein said feedstock has a pour point of above −10° C. and the deparaffinned product of the deparaffinning has a pour point of less than 0° C.

16. The process as claimed in claim 1, wherein said feedstock has a content of sulfur compounds between 0 ppm and 100 ppm by weight of sulfur, and a content of nitrogen compounds of between 0 ppm and 100 ppm by weight of nitrogen.

17. The process as claimed in claim 1, wherein said catalyst has a total content of IZM-2 zeolite and zeolite of MFI framework type code of between 20% and 80% by weight.

18. The process as claimed in claim 1, wherein said catalyst contains 2.5% to 50% by weight of said hydro-dehydrogenating phase expressed in oxide form.

19. The process as claimed in claim 1, wherein said catalyst contains 0.5% to 10% by weight of group VIII metal expressed in oxide form, and 2% to 40% by weight of group VIB metal expressed in oxide form.

20. The process as claimed in claim 1, wherein the support of said catalyst has a total pore volume measured by mercury porosimetry of between 0.1 and 1 cm$^3$/g and a specific surface area of the support of between 100 m$^2$/g and 500 m$^2$/g.

21. The process as claimed in claim 1, wherein the mass ratio of the IZM-2 zeolite to the zeolite of MFI framework type code in said support of is between 0.25 and 9.

\* \* \* \* \*